Nov. 10, 1942.  H. J. LUFF  2,301,896
CONNECTION FOR PLUMBING FIXTURES
Filed May 8, 1942
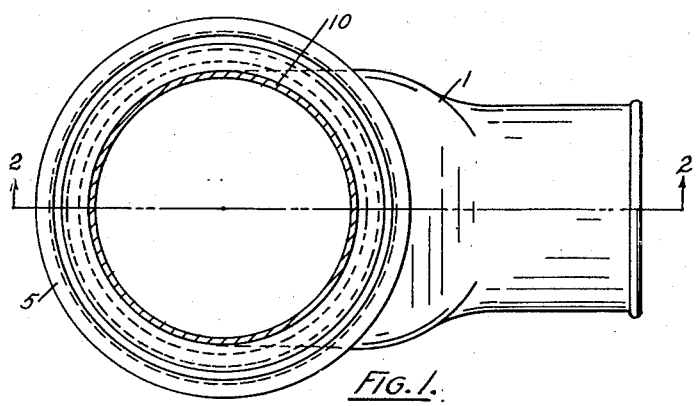
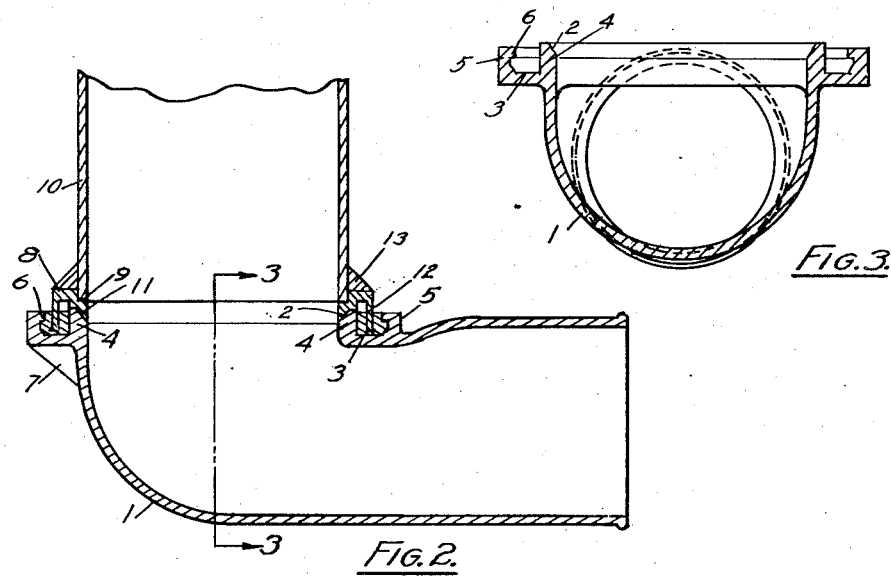
INVENTOR
HENRY J. LUFF
BY
ATTORNEYS Patented Nov. 10, 1942

2,301,896

UNITED STATES PATENT OFFICE 2,301,896

CONNECTION FOR PLUMBING FIXTURES

Henry J. Luff, Cleveland, Ohio, assignor to J. A. Zurn Manufacturing Company, Erie, Pa., a corporation of Pennsylvania Application May 8, 1942, Serial No. 442,268

4 Claims. (Cl. 285—115)

This invention relates generally to a plumbing fitting, and more particularly to connecting means for plumbing fittings, pipes and the like.

All devices of this character made according to the teachings of the prior art and with which I am familiar have been very inefficient, especially when it has been necessary to connect lead pipe lengths leading from a closet connection to iron pipes forming part of the drainage system. This has been particularly true where threading of the pipes is impractical. It is quite apparent that direct soldered connections between the lead and iron pipe would be very inefficient. It has been particularly difficult to connect pipes or pipes and fittings where there has been some misalignment angularly or otherwise.

It is, accordingly, an object of my invention to overcome the above difficulties in connecting means for pipes of analogous or non-analogous materials, and it is more particularly an object of my invention to provide a connecting means for pipes which is simple in construction, efficient in operation and economical in cost and easy to install.

Another object of my invention is to provide a connection for pipes of analogous or non-analogous materials which require no threads.

Another object of my invention is to provide a connection for pipe lines which permits substantial misalignment without reducing the efficiency of the connection.

Other objects of my invention will become evident from the following detailed description taken in conjunction with the accompanying drawing, in which:

Fig. 1 is a plan view of my novel pipe connecting means.

Fig. 2 is a side elevational view taken on the line 2—2 of Fig. 1.

Fig. 3 is a view taken on the line 3—3 of Fig. 2.

Referring now to the drawing, Figs. 1, 2 and 3 show a fitting 1 having a bevelled surface 2 at the mouth of the inlet portion thereof, and an annular substantially U-shaped channeled projecting portion 3 surrounding the inlet portion of the fitting 1. The inner leg 4 of the U-shaped channel portion 3 extends upwardly to a greater height than the outer leg 5 thereof to prevent flowing material from passing into the fitting 1. The U-shaped channeled portion 3 has an offset portion 6 to secure caulking material or the like therein. Ribs 7 support the U-shaped channel portion 3.

A substantially L-shaped member 8 has a seating surface 9 for a pipe 10 and a bevelled surface 11 for engaging the bevelled surface 2 on the inlet opening of the fitting 1. A depending apron 12 extends into the opening in the U-shaped channelled member 3. It will be evident that by providing bevelled surfaces between the member 8 and the fitting 1, the pipe 10 and the fitting 1 may be misaligned without destroying the efficiency of the connection between them. The pipe 10 is secured to the annular member 8 by suitable soldering or welding material 13.

It will be evident that this form of joint forms its most efficient adaptation in the connection between the waste pipe which is run beneath the floor level of a room and a lead pipe leading from a water closet or similar fixture. Such fixtures are often subject to shocks which cause vertical or lateral movement or combinations thereof and consequently it is desirable to have a connection which will permit this movement, without destroying the efficiency of the connection. It is therefore desirable that the joint between the lead pipe and the waste pipe shall be composed of lead to the fullest extent possible, and it is necessary to provide a joint which will not pull apart in case bending forces are applied to the pipe 10. The wiped or soldered joint 13 will outline a relatively large joint area and will thus prevent the joint from pulling apart in case of bending of the pipe 10. By providing the inner lip or leg 4 of the U-shaped channel member 3 at a greater height than the outer lip or leg 5 of the U-shaped channel member 3, lead may be poured into the open channelled portion of the U-shaped portion 3 without flowing over into the pipe. This connection may be used between analogous or non-analogous metals. The member 8 is preferably made of a non-ferrous material when used with lead because of the better joint provided. When lead is poured and caulked into the open channel portion of the U-shaped portion 3, it tends to prevent any relative rotation between the pipe 10, annular member 8 and fitting 1.

It will be evident from the foregoing that I have provided a novel joint or connection between waste pipes and the like or any other pipe and plumbing fitting, the whole connection preferably being made with a lead material or the like. I have further provided a most efficient means for connecting pipes made of non-analogous materials.

Various changes may be made in the specific embodiment of the present invention without departing from the spirit thereof or from the scope of the appended claims.

What I claim is:

1. A connection for pipes, comprising a pipe, a generally U-shaped annular channel surrounding said pipe, a generally L-shaped annular ring member having one leg thereof extending into said U-shaped channel and the other leg thereof having a seating surface for a pipe, binding material disposed in said U-shaped ring member, a second pipe, and means for securing said second pipe to said L-shaped ring member.

2. A connection for pipes, comprising a pipe having the end thereof bevelled, a generally U-shaped channel portion surrounding said pipe, a generally L-shaped ring member having one leg thereof extending into said channel portion and the other leg thereof having a seating surface for a pipe and a bevelled surface for engaging the bevelled surface of said pipe, a second pipe seating on the seating surface of said ring, means for securing said second pipe to said ring member and said ring member to said channel portion.

3. A connection for pipes, as set forth in claim 2, wherein the inner leg of said generally U-shaped channel portion is of greater heighth than the outer leg thereof.

4. A connection for pipes, comprising a pipe having a bevelled end, a second pipe, a generally U-shaped channel member surrounding said bevelled end of said first-mentioned pipe, the inner side of the outer leg of said U-shaped member having a recessed portion, a generally L-shaped ring member having a seating surface for said second pipe and a bevelled surface for engaging the bevelled end of said first-mentioned pipe, caulking material for securing one leg of said generally L-shaped ring member to said U-shaped member, and means for securing said second pipe to said ring member.

HENRY J. LUFF.